C. O. ELLERT.
SAFETY PIN.
APPLICATION FILED APR. 12, 1920.
1,385,743.
Patented July 26, 1921.
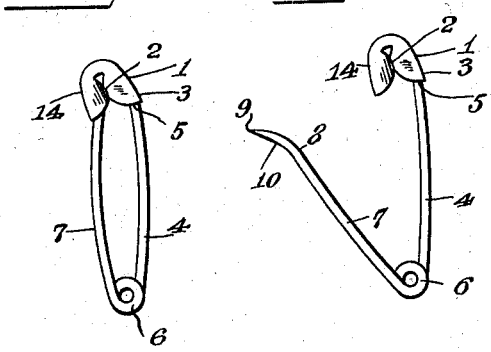
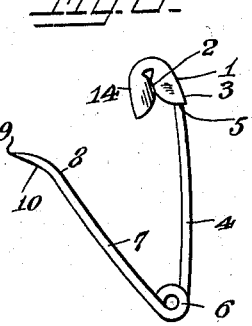
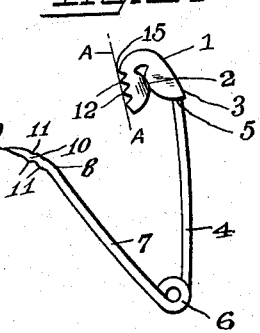
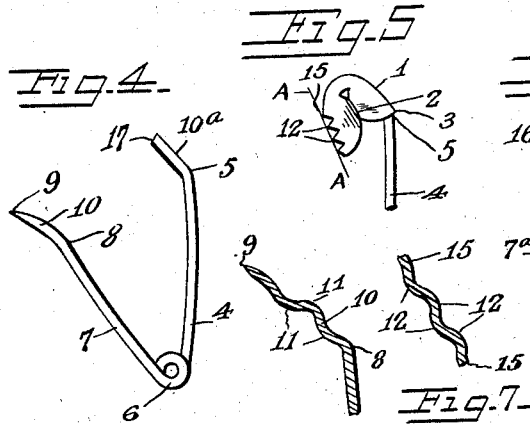
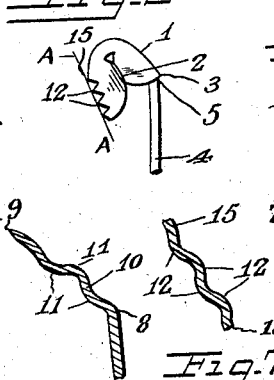
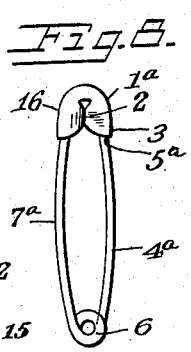
Inventor.
Charles O. Ellert.

UNITED STATES PATENT OFFICE.

CHARLES O. ELLERT, OF BROOKLYN, NEW YORK.

SAFETY-PIN.

1,385,743.  Specification of Letters Patent.  Patented July 26, 1921.

Application filed April 12, 1920. Serial No. 373,223.

*To all whom it may concern:*

Be it known that I, CHARLES O. ELLERT, a citizen of the United States, and resident of the city of New York, borough of Brooklyn, county of Kings, and State of New York, have invented certain new and useful Improvements in Safety-Pins, of which the following is a full, clear, and exact specification.

This invention relates to safety pins and has for its object to provide a safety pin peculiarly designed to be secured more firmly, and readily permit the disengagement of the improved safety pin with the greatest ease and despatch.

Another object is to provide an improved safety pin having a reinforced construction more resistant against accidental opening or loosening of the safety pin.

A still further object is to provide a device of this nature which is simple in construction, effective in operation, and cheap to manufacture.

With the foregoing and other objects in view, the invention consists in the novel arrangement and combination of parts hereinafter described and claimed, reference being had to the accompanying drawings in which like reference characters refer to like parts throughout the several views.

Figure 1 is a side elevation of the improved safety pin in closed position.

Fig. 2 is a side elevation of the improved safety pin in an open position.

Fig. 3 is a side elevation of the improved safety pin in an open position showing a modification in construction.

Fig. 4 is a side elevation showing wire portion of safety pin broken away from the clasp or holding means.

Fig. 5 is an enlarged detail view of a clasp or holding means broken away from part of the wire portion of the safety pin.

Fig. 6 is an enlarged broken section of supplemental flared portion of pointed limb of safety pin provided with auxiliary corrugations or holding means.

Fig. 7 is an enlarged detail section on line A—A, Figs. 3 and 5, showing co-acting auxiliary corrugations or holding means provided in clasp or holding means of the safety pin.

Fig. 8 is a side elevation of a safety pin without the reinforced construction in a closed position.

Fig. 9 is a side elevation of a safety pin without the reinforced construction in an open position.

As shown, the improved safety pin is provided with a clasp or holding means 1, suitably positioned on limb 4, in a flared or diverging relation to the co-acting flared portion 10, of the limb 7.

The improved safety pin is designed from a single length of suitable material, preferably of wire or like material, and embodies the spaced parallel limbs 4 and 7, and provided with a spring actuated loop 6, or like end connecting the lower portions thereof.

The limb 4, Fig. 4, at a suitable point 5, at or near its upper end is provided with a suitable inwardly diverging or flared portion as 10$^a$, and adapted to engage with said clasp or holding means 1; the end 17, of said flared portion 10$^a$, terminates in a suitable manner.

The clasp or holding means 1, is at 3 secured to said flared portion 10$^a$, in a manner so that said clasp or holding means 1, is flared in co-acting relation with said flared portion 10, of the opposite limb 7.

The co-acting limb 7, of the improved safety pin at a suitable point as 8, near the upper end thereof, is provided with a suitable diverging or flared portion 10, terminating in a suitably pointed end 9, said flared portion 10 being adapted as a stiffening or reinforcing means for said limb 7.

In the modification in construction, the said flared portion 10, provided with suitable corrugations or holding means 11, Figs. 3 and 6, is adapted to engage with similar or co-acting corrugations or holding means 12, provided in the face 15, of said clasp or holding means 1. Figs. 6 and 7 show enlarged detail sections of said corrugations or holding means 11 and 12 respectively.

The said flared or diverging portion 10, of the limb 7, is positioned to engage with the co-acting flared clasp or holding means 1, of the improved safety pin.

When corrugations or holding means 11, are provided in the said flared portion 10, said corrugations 11, are adapted to engage and co-act with corrugations or holding means 12, in the face 15, of the said clasp or holding means 1 to resist the slipping or sliding of the limb 7 out of engagement with said clasp 1, by reason of excessive pulling strain on said limb 7.

In opening the improved safety pin, the diverging or flared portion 10, of said limb 7, is disengaged from the face 14 of the said flared clasp 1, passing through the opening 2, in the clasp. The corrugations 11, of said flared portion 10, are disengaged from the co-acting corrugations 12, shown in the face 15, Figs. 3 and 7, of the said flared clasp or holding means 1, of the improved safety pin.

While I have shown a preferred embodiment of the invention, it will be understood that the invention is not to be limited to exact details of construction herein shown and described, and change therein and modification thereof may be made within the scope of the appended claims without departing from the spirit of the invention or sacrificing its advantages.

Having described my invention, what I claim is:

1. A pin having a member provided with a holding clasp, and a spring actuated member provided with a straight main portion and having one end terminating in a flared portion having a pointed end, said flared portion adapted to lie wholly within said holding clasp and form a holding means to detachably lock said spring actuated member.

2. A safety pin of the class described having opposing parallel limbs connected at one of their ends by a spring actuated loop, and the opposite ends of said limbs being constructed with parallel offset ends flared in parallel relation to the main portion of said opposing limbs, and a clasp positioned on offset end of one of said limbs and adapted to engage the pointed offset end of opposing limb in coacting offset relation.

3. A pin having a member provided with an offset holding clasp, and a spring actuated member provided with a reinforcing means, said means including an offset portion of said spring actuated member positioned adjacent the pointed end of said spring actuated member, said offset portion together with said pointed end adapted to lie wholly within said offset holding clasp and detachably lock said pin.

4. A pin having a member provided with a holding clasp, and a spring actuated member provided with a straight main portion and having one end terminating in a flared portion having a pointed end, said flared portion adapted to lie wholly within said holding clasp, and auxiliary holding means provided in said flared portion and adapted to engage said holding clasp.

In testimony whereof, I have signed my name in the presence of two subscribing witnesses.

CHARLES O. ELLERT.

Witnesses:
JOSEPH HOYM,
AUGUST GEIB.